(12) United States Patent
Yelloz et al.

(10) Patent No.: US 10,776,940 B2
(45) Date of Patent: Sep. 15, 2020

(54) COLLABORATIVE TARGETING METHOD

(71) Applicant: SAFRAN ELECTRONICS & DEFENSE, Boulogne Billancourt (FR)

(72) Inventors: Jacques Yelloz, Boulogne Billancourt (FR); Maxime Thiebaut, Boulogne Billancourt (FR); Guillaume Magniez, Boulogne Billancourt (FR); Marc Bousquet, Boulogne Billancourt (FR); Christophe Guettier, Boulogne Billancourt (FR)

(73) Assignee: SAFRAN ELECTRONICS & DEFENSE, Boulogne Billancourt (FR)

( * ) Notice: Subject to any disclaimer, the term of this patent is extended or adjusted under 35 U.S.C. 154(b) by 274 days.

(21) Appl. No.: 15/764,161

(22) PCT Filed: Sep. 27, 2016

(86) PCT No.: PCT/EP2016/072948
§ 371 (c)(1),
(2) Date: Jul. 3, 2018

(87) PCT Pub. No.: WO2017/055262
PCT Pub. Date: Apr. 6, 2017

(65) Prior Publication Data
US 2019/0073789 A1 Mar. 7, 2019

(30) Foreign Application Priority Data
Sep. 29, 2015 (FR) ...................................... 15 59158

(51) Int. Cl.
*G06K 9/00* (2006.01)
*G06T 7/73* (2017.01)
(Continued)

(52) U.S. Cl.
CPC ............ *G06T 7/73* (2017.01); *G06K 9/00664* (2013.01); *G06K 9/3233* (2013.01); *G06T 7/33* (2017.01); *G06T 7/593* (2017.01); *F41G 3/02* (2013.01)

(58) Field of Classification Search
None
See application file for complete search history.

(56) References Cited

U.S. PATENT DOCUMENTS 8,121,433 B2 * 2/2012 Leprince ................ G01C 11/02
342/355
9,285,296 B2 * 3/2016 Georgeson ......... G01N 21/8851
(Continued)

OTHER PUBLICATIONS

Nov. 28, 2016 Search Report issued in International Patent Application No. PCT/EP2016/072948.

*Primary Examiner* — Hadi Akhavannik
(74) *Attorney, Agent, or Firm* — Oliff PLC; R. Brian Drozd

(57) ABSTRACT

Method for collaborative observation between a local targeting device and a distant targeting device located at different geographical positions and able to acquire images. The method including: when it is implemented by the local targeting device, execution of a procedure for determining a position of an observed object, referred to as the local targeted object, including application of a method for matching points of interest, determined on a local image by the local targeting device, representing a distant image obtained from the distant targeting device. If matching is successful, the local targeting device determines the position of the local targeted object according to information representing a position of a distant targeted object supplied by the distant targeting device and a transformation law allowing to pair the distant and local points of interest obtained when said (Continued)

Figure 1:
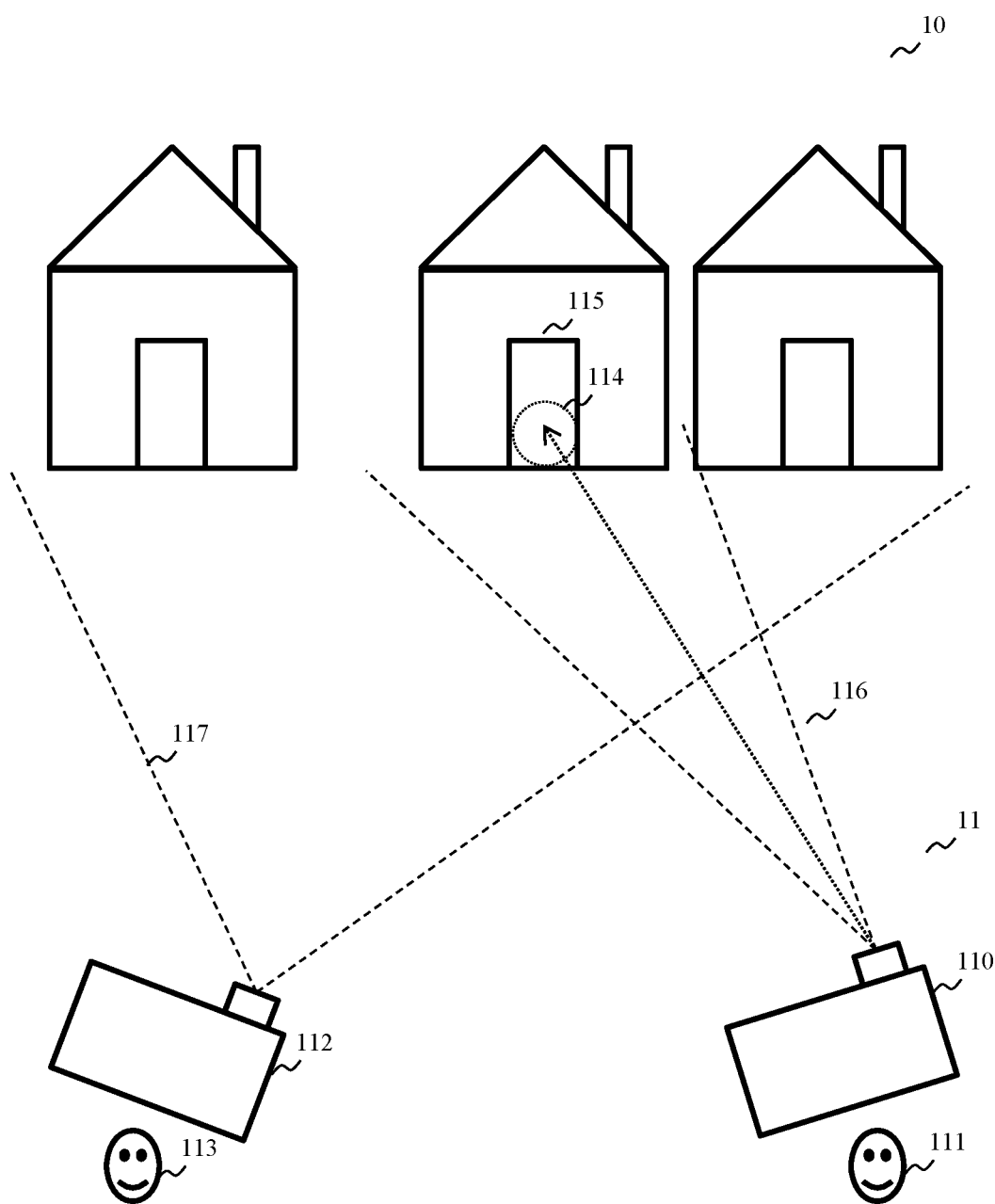

matching method is applied and controls display of an image comprising the local targeted object.

9 Claims, 4 Drawing Sheets

(51) Int. Cl.
    *G06T 7/33*     (2017.01)
    *G06T 7/593*     (2017.01)
    *G06K 9/32*     (2006.01)
    *F41G 3/02*     (2006.01)

(56) References Cited

U.S. PATENT DOCUMENTS

| | | | |
|---|---|---|---|
| 9,329,271 B2 * | 5/2016 | Ossig | G01S 7/51 |
| 2007/0209501 A1 | 9/2007 | Ko | |
| 2012/0201469 A1 | 8/2012 | Livet et al. | |
| 2015/0146015 A1 * | 5/2015 | Sommerlade | F41G 1/38 |
| | | | 348/187 |

* cited by examiner

COLLABORATIVE TARGETING METHOD

The present invention relates to a method for collaborative targeting between targeting devices situated at different geographical positions, targeting devices able to implement said method and a system comprising a plurality of targeting devices in which said method is implemented.

A plurality of operators equipped with observation or viewing means and observing the same scene frequently have to coordinate a common action. Such a situation occurs for example when an observer must designate one or more targets to other distant observers.

In a first approach allowing to manage this type of situation, a first operator orally describes a target to at least a second operator using a communication means such as a radio communication means. The target and distinctive elements surrounding this target are described. The second observer can then focus his targeting device on the target. This approach, although very much used, is relatively approximate and therefore presents risks of errors that may have very detrimental consequences in certain contexts.

A second approach is based on the fact that each observer has a location device for measuring information on the location of said observer such as a position of said observer in a common geographical reference frame and a direction in which said observer is viewing. In this approach, at least one observer referred to as the "coordinator" has a distance measuring device which, when it is used in combination with the location device of the coordinator, enables him to determine a geographical position of a target. The determined geographical position of the target is next transmitted by means of a communication means to the other observers, referred to as "addressees". The addressees, thus knowing their relative position with respect to the target, can then focus their targeting device on said target.

The location devices, such as a GPS (global positioning system) device and the distance measuring devices, such as a laser telemeter and a magnetic compass, allowing, when they are used in combination, to precisely determine the relative position of an observer with respect to his target, are not very widespread since they are very expensive and heavy. For this reason, a conventional observer has few location means apart from his targeting device and sometimes a GPS device.

The objective of the invention is to solve the problems mentioned above. The invention aims in particular to propose a method for collaborative targeting between targeting devices situated at different geographical positions enabling the targeting devices to exchange reliable and precise information representing a target.

To this end, according to a first aspect of the present invention, the present invention relates to a method for collaborative targeting between a local targeting device and a distant targeting device located at different geographical positions and able to acquire at least one image, referred to respectively as the local image and the distant image. The method comprises, when it is implemented by the local targeting device, the following step: executing a procedure for determining a position of an observed object, referred to as the local targeted object, comprising: obtaining from the distant targeting device information representing a position of an observed object, referred to as the distant targeted object, in a first distant image, referred to as the distant designation image; obtaining from the distant targeting device information representing points of interest, referred to as distant points of interest, representing a second distant image, referred to as the distant points of interest image; determining points of interest, referred to as local points of interest, representing a first local image, referred to as the local points of interest image; applying a method for matching points of interest with the local points of interest and the distant points of interest, the purpose of which is to obtain a transformation law allowing to pass from the local points of interest to the distant points of interest; checking whether the application of the matching method allowed to obtain a transformation law; if no transformation law is obtained, determining that no collaborative targeting is possible; if a transformation law has been obtained, determining in a second local image, referred to as the local designation image, the position of the local targeted object according to positioning information comprising the information representing the position of the distant targeted object and the transformation law and; controlling a display of a third local image, referred to as the local follow-up image, so as to allow identification of the local targeted object.

In this way, an operator using the local targeting device can obtain a local image in which an object observed from the distant targeting device is easily identifiable.

According to one embodiment, the transformation law is obtained by an approach based on a determination of a homographic function or an approach based on a bundle adjustment algorithm.

According to one embodiment, during the step consisting of controlling the display of a local follow-up image, a reticle is displayed in the local follow-up image at the position of the local targeted object.

According to one embodiment, the local targeting device is provided with one or more motors capable of automatically directing the local targeting device towards an observed object and, during the step consisting of controlling the display of a local follow-up image, the position of the local targeted object is used to control each motor so that the local targeted object appears at the centre of the local follow-up image.

According to one embodiment, during the step consisting of determining the position of the local targeted object, a step of monitoring the local targeted object during which an estimation of a movement of the local targeted object between the local monitored image and the local points of interest image is carried out by the local targeting device, the position of the local targeted object in the local follow-up image being determined also by taking into account said movement of the local targeted object between said local monitored image and the local points of interest image.

According to one embodiment, following the carrying out of the estimation of the movement of the local targeted object, the local targeting device determines, according to an amplitude of said movement of the local targeted object, whether an updating of the distant and local points of interest is necessary and, if an updating of the distant and local points of interest is necessary, transmits a message to the distant targeting device so that the distant targeting device transmits new information representing the positions of the distant targeted object and new distant points of interest, the local targeting device executing the procedure of determining a position of the local targeted object after reception of new information representing the position of the distant targeted object and of new distant points of interest.

According to one embodiment, the local targeting device executes the procedure of determination of the position of the local targeted object when it receives, from the distant targeting device, movement information associated with the distant points of interest and the distant targeted object, the information representing the distant points of interest and the position of the distant targeted object being updated during the execution of the procedure for determining the position of the local targeted object using said movement information associated with said distant points of interest and said distant targeted object.

According to one embodiment, the local targeting device executes the procedure for determining the position of the local targeted object when it receives, from the distant targeting device, information representing a new position of the distant targeted object and information representing new distant points of interest.

According to one embodiment, the local targeting device periodically obtains, from the distant targeting device, information representing a new position of the distant targeted object and information representing new distant points of interest.

According to one embodiment, the local targeting device obtains information representing a new position of the distant targeted object and information representing new distant points of interest when an amplitude of a movement of the distant targeted object between the distant designation image and a third distant image, referred to as the distant follow-up image, following the distant designation image, is above a first predefined threshold.

According to one embodiment, the local targeting device obtains information representing a new position of the distant targeted object and information representing new distant points of interest when a proportion of distant points of interest for which an amplitude of movement between the distant designation image and a third distant image, referred to as the distant follow-up image, following the distant designation image is above a first predefined threshold, is above a second predefined threshold.

According to one embodiment, the distant designation image and the distant points of interest image are the same image or two different images.

According to one embodiment, the local points of interest image and the local designation image are the same image or two different images and, when the local points of interest image and the local designation image are two different images, an estimation of the movement of the local targeted object between the local points of interest image and the local designation image is carried out, the determination of the position of the local targeted object in the local designation image takes into account said movement of the local targeted object between the local points of interest image and the local designation image.

According to one embodiment, the distant designation image corresponds timewise to the local points of interest image.

According to a second aspect of the invention, the invention relates to a targeting device, referred to as the local targeting device, situated at a first geographical position and able to acquire images, referred to as local images. The local targeting device comprises: means for executing a procedure for determining a position of an observed object, referred to as the local targeted object, comprising: means for obtaining, from a distant targeting device, situated at a second geographical position different from the first geographical position, information representing a position of an observed object, referred to as the distant targeted object, in a first image acquired by the distant targeting device, referred to as the distant designation image; means for obtaining from the distant targeting device information representing points of interest, referred to as distant points of interest, representing a second image acquired by the distant targeting device, referred to as distant images of points of interest, means for determining points of interest, referred to as local points of interest, representing a first local image, referred to as the local points of interest image, means for applying a method for matching points of interest with the local points of interest and with the distant points of interest, the purpose of which is to obtain a transformation law allowing to pass from the local points of interest to the distant points of interest, means for checking whether the application of the matching method has allowed to obtain a transformation law, means for determining that no collaborative observation is implemented if no transformation law has been obtained; means for determining, in a second local image, referred to as the local designation image, the position of the local targeted object according to positioning information comprising the information representing the position of the distant targeted object and the transformation law and means for controlling a display of a third local image, referred to as the local follow-up image, so as to allow identification of the local targeted object, used if a transformation law has been obtained.

According to a third aspect of the invention, the invention relates to an targeting device, referred to as the distant targeting device, situated at a first geographical position and able to acquire images, referred to as distant images. The distant targeting device comprises: means for designating an observed object, referred to as the distant targeted object; means for determining points of interest, referred to as distant points of interest, representing a first distant image, referred to as the distant points of interest image; means for transmitting information representing a position of the distant targeted object and distant points of interest to a local targeting device according to the second aspect, situated at a second geographical position different from the first geographical position so as to allow execution of a procedure for determining a position of a targeted object corresponding to the distant targeted object, referred to as the local targeted object, by the local targeting device.

According to a fourth aspect of the invention, the invention relates to a collaborative targeting system comprising a local targeting device according to the second aspect and at least one distant targeting device according to the third aspect.

According to a fifth aspect of the invention, the invention relates to a computer program product comprising instructions for the implementation, by a device, of the method according to the first aspect, when said program is executed by a processor of said device.

According to a sixth aspect of the invention, the invention relates to storage means storing a computer program comprising instructions for the implementation, by a device, of the method according to the first aspect when said program is executed by a processor of said device.

Figure 2A:
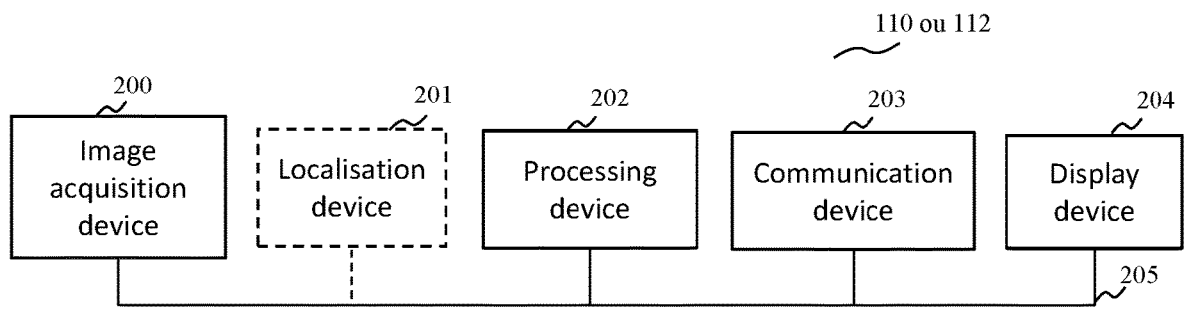
Figure 2B:
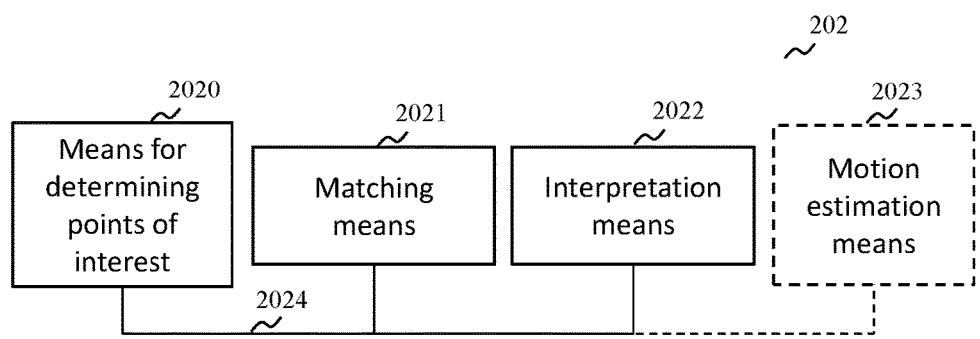
Figure 3:
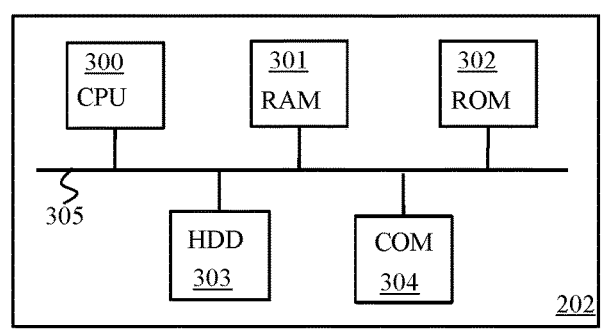
Figure 4:
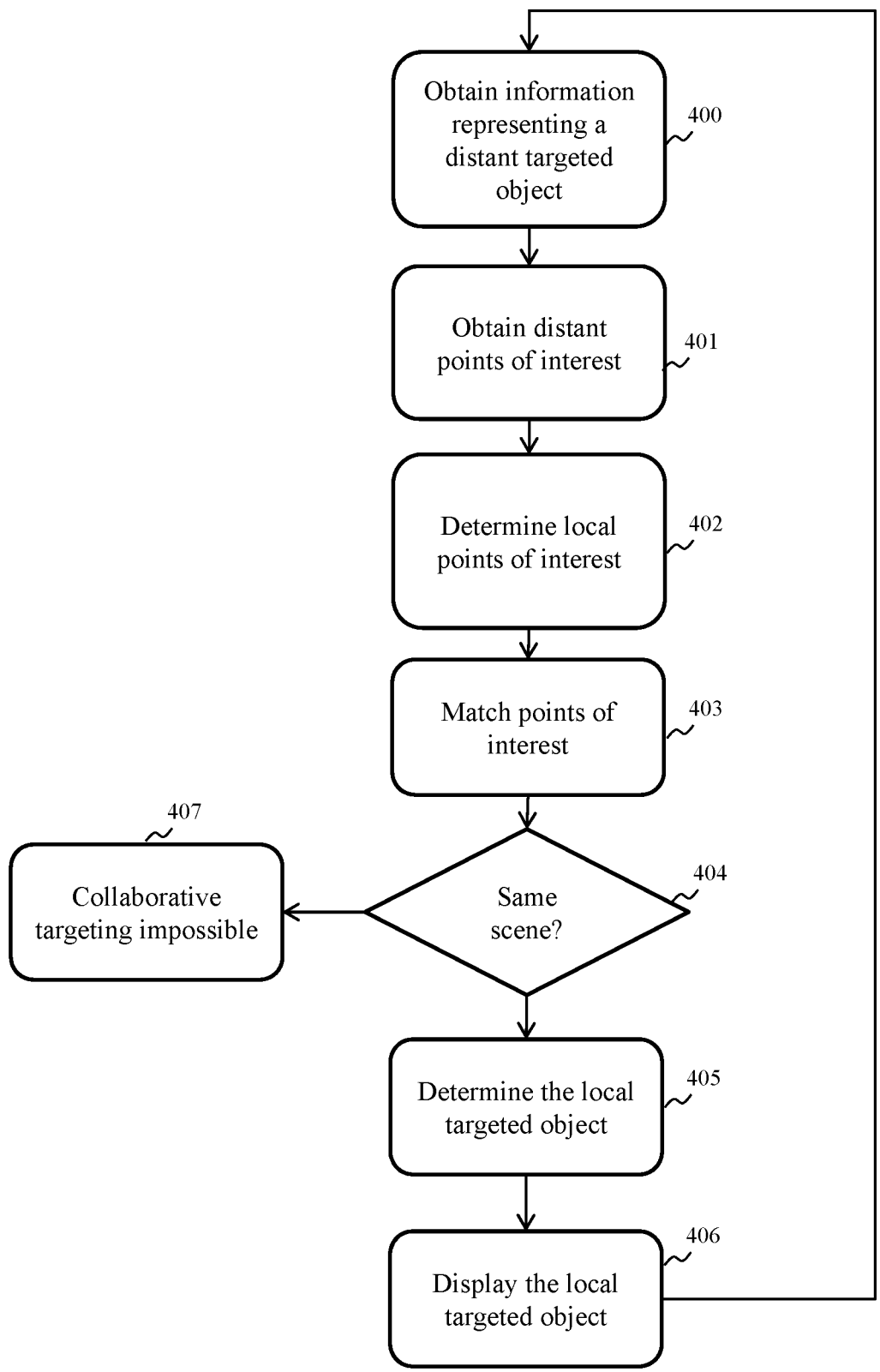
Figure 5:
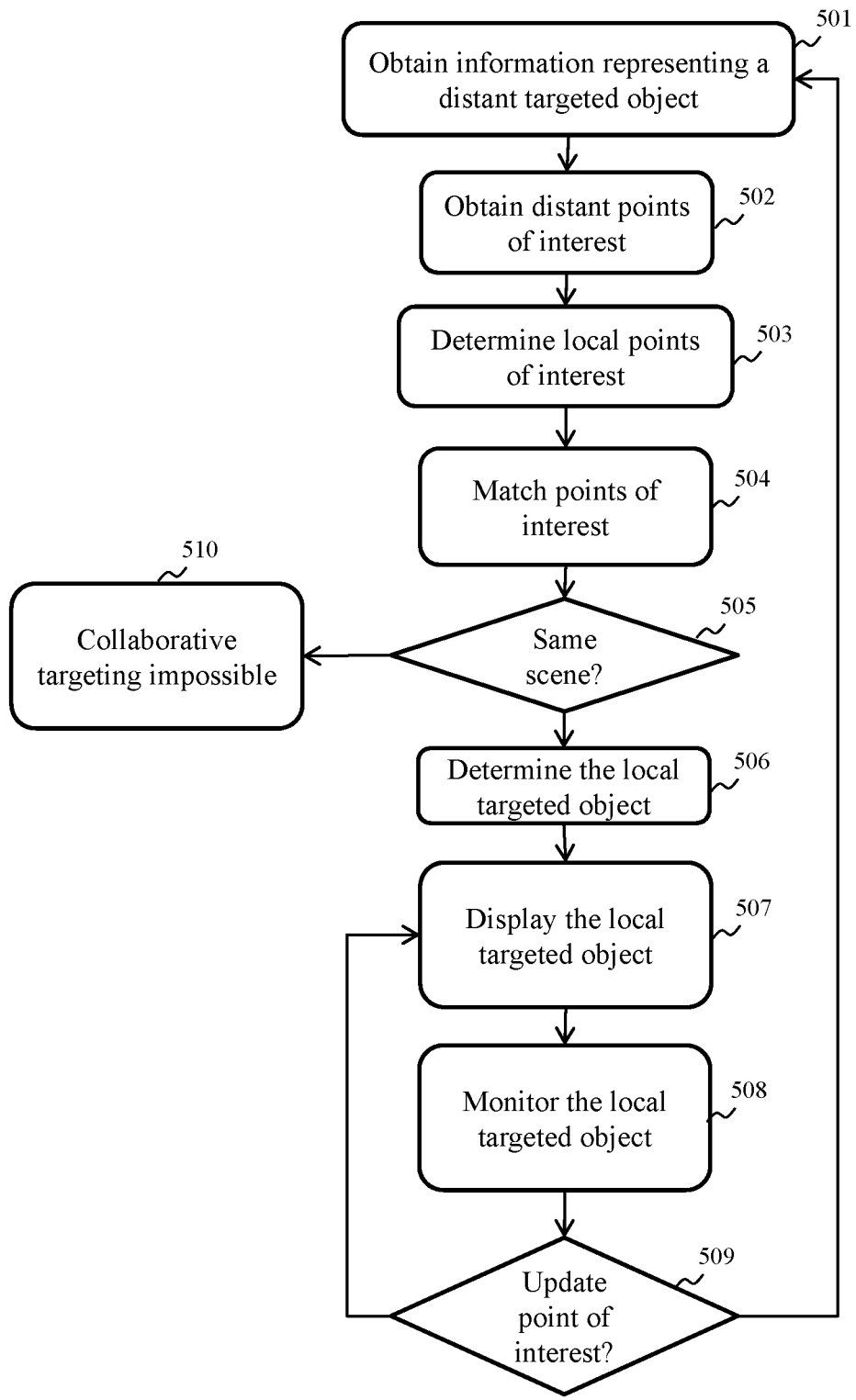

The features of the invention mentioned above, as well as others, will emerge more clearly from a reading of the following description of an example embodiment, said description being given in relation to the accompanying drawings, among which:

FIG. 1 shows schematically an example of a system comprising targeting devices according to the invention, FIG. 2A shows schematically an targeting device according to the invention, FIG. 2B shows schematically a processing device included in the targeting device according to the invention, FIG. 3 illustrates schematically an example of hardware architecture able to implement the processing device, FIG. 4 shows an algorithm of a collaborative targeting method according to a first embodiment of the invention, and FIG. 5 shows an algorithm of a collaborative targeting method according to a second embodiment of the invention.

FIG. 1 shows schematically an example of a system 11 comprising at least two targeting devices. Each targeting device is able to acquire and display images of a scene 10 at which said targeting device is pointed at and in which an observed object 115 is situated. As we describe hereinafter, the observed object is marked in said images for example by a visual reticle enabling for example an observer to identify the observed object in said images. Here the system 11 comprises two targeting devices 110 and 112, each targeting device 110, 112 being, in this example, manipulated by an observer, respectively 111 and 113. By means of his targeting device 110, the observer 111 focuses on part of the scene 10 according to a first point of view 116 whereas the observer 116 focuses on another part of the scene 10 according to a second point of view 117. Each observer has designation means (not shown) able to designate an object in a scene. In one embodiment, the designation means are integrated in each targeting device. The designation means may for example be a laser pointer produced by a laser designator. In the example in FIG. 1, the observer 111 designates an object 115 targeted by the targeting device 110, using designation means 114. The targeting device 111 is referred to hereinafter as the distant targeting device.

According to a method that we describe below in relation to FIG. 4 or 5, the observer 111 transmits information representing the targeted object 115 to the observer 113. By means of this information, the observer 113 uses his targeting device 112, referred to as the local targeting device, to find the object observed by the observer 111 in accordance with a method described in relation to FIG. 4 or 5.

FIG. 2A shows schematically a targeting device that may be the local 112 or distant 110 targeting device. The local targeting device 112 (and respectively the distant targeting device 110) comprises an image acquisition device 200 comprising an optical module and an image sensor, neither shown. The image acquisition device 200 is able to acquire images of a scene on which the local targeting device 112 (and respectively the distant targeting device 110) is focused with a fixed image frequency for example of thirty images per second.

The local targeting device 112 (and respectively the distant targeting device 110) also comprises a processing device 202 able to implement a collaborative targeting method that we describe hereinafter in relation to FIG. 4 or 5. The processing device 202 is described hereinafter in relation to FIG. 2B.

Moreover, the targeting device 20 comprises:
  a communication device 203 such as a radio communication module enabling the local targeting device 112 (and respectively the distant targeting device 110) to exchange data with other targeting devices, and
  a display device 204 such as a screen, a head-up display or an eyepiece of a sighting device, a pair of binoculars, a telescope or a photographic apparatus.

In one embodiment, the local targeting device 112 (and respectively the distant targeting device 110) comprises a localization device 201 allowing to determine a geographical position of the local targeting device 112 (and respectively the distant targeting device 110). The localization device may comprise for example a GPS module.

The devices 200 to 204 of the targeting device 20 use a communication bus 205 for exchanging data, such as for example:
  image data that are exchanged between the image acquisition device 200 and the processing 202 and display 203 devices,
  data issuing from methods used by the processing device 202 that are exchanged between the processing device 202 and the communication 203 and display 204 devices,
  location data that are exchanged between the localization device 201 and the processing device 202.

FIG. 2B shows schematically the processing device 202. The processing device 202 comprises means for determining points of interest 2020 in an image. It is usual to use points of interest in methods for seeking an object in one or more images. A search for an object in an image amounts in fact to a search for points of interest representing the object in said image. The points of interest may then be considered to be a signature of the object. These points of interest are determined by means for determining points of interest. Many methods for determining points of interest have been proposed in the literature. These methods are generally classed in three categories:
  Contour-based approaches: contour-based approaches comprise a step of detecting contours in an image, and a step of determining points of interest along the contours. The points of interest are then points of intersection of two contours or points on a contour where the curvature of the contour is maximum.
  Intensity-based approaches: an intensity-based approach consists of observing the intensity of the points in an image and seeking points of maximum intensity characteristic of a point of interest.
  Model-based approaches: the model-based approach consists of revealing a point of interest by comparing an intensity function of the points of an image with theoretical models of this intensity function.

Intensity-based approaches are generally the most used. In one embodiment, the means for determining points of interest use an intensity-based method such as a method based on the Harris operator (C. Harris and M. Stephens (1988). "A combined corner and edge detector", Proceedings of the 4th Alvey Vision Conference. pp. 147-151).

The processing device 202 also comprises means for matching points of interest 2021 coming from two different images. Matching points of interest allows to determine whether two images contain one or more identical objects. Matching points of interest allows to pair points of interest coming from a first image with points of interest coming from a second image and to determine a transformation law allowing to pass from the first image to the second image. Since the first and second images correspond to different viewpoints of a scene, determining the transformation law requires taking into account a difference between the viewpoints and a geometry of the scene. There exist various approaches for matching points of interest. The following can for example be cited:
  Approaches based on a determination of a homographic function allowing to connect points of interest on a first image with points of interest on a second image.
  Approaches based on a so-called "bundle adjustment" algorithm, allowing firstly to determine a difference in viewpoint and secondly to replace the paired points of interest in a three-dimensional space.

The means for matching points of interest 2021 take two lists of points of interest as an input. A first list of points of interest, referred to as "local points of interest", comes from the means for determining points of interest 2020 of the local targeting device 112 and corresponds to an image, referred to as a "local image", acquired locally by the image acquisition device 200 of the local targeting device 112.

A second list of points of interest, referred to as "distant points of interest", is received by the means for matching points of interest 2021 of the local targeting device 112 by means of the communication device 203 of the local targeting device 112. The distant points of interest correspond to an image, referred to as the "distant image", acquired by the distant targeting device 110.

When matching points of interest is possible, the matching means 2021 provide as an output paired points of interest and a transformation law allowing to pass from the distant image to the local image and vice versa. It should be noted that, when the two images the points of interest of which it is wished to match are very different, the points of interest of the two images may not match. The matching means 2021 may then provide a number of paired points of interest insufficient to determine a transformation law. Points of interest may also be matched by error whereas they do not represent the same object. In this case, determination of the transformation law may prove to be impossible or provide an invalid transformation law not allowing to pass from one image to another.

Moreover, the processing device 202 comprises interpretation means 2022 able to interpret results transmitted by the matching means 2021.

One of the roles of the interpretation means 2022 is to check the results of the matching points of interest. When the interpretation means 2022 finds that it has been possible to determine a transformation law, they may deduce from this that the scenes looked at by the distant targeting device 110 and the local targeting device 112 have a high probability of being identical.

A second role of the interpretation means 2022 is to determine the position of an object observed by the distant targeting device 110 in a local image acquired by the local targeting device 112. To do this, the interpretation means 2022 receive information representing a position of an object, referred to as the "distant targeted object", observed by the distant targeting device 110. Said information is received by means of the communication device 203 for example, at the same time as the list of distant points of interest. Said information corresponds to an object designated by the observer 111 associated with the distant targeting device 110 using his designation device. When a transformation law has been able to be determined by the matching means 2021, the transformation law is applied to the location information on the distant targeted object, which allows to obtain information on the location of an object, referred to as the "local targeted object", corresponding to the distant targeted object in a local image.

A third role of the interpretation means 2022 is to allow the identification by an observer, such as the observer 113, of the local targeted object in a local image. In one embodiment, the interpretation means 2022 transmit, to the display device 204 of the local targeting device 112, the location information on the local targeted object obtained previously. The display device 204 of the local targeting device 112 then controls the display of the local image by marking the local targeted object, for example by a graphical reticle displayed superimposed on the local image.

In one embodiment, the processing device 202 comprises means 2023 for estimating movement between two images. The movement estimation means 2023 determine movements in the images acquired by the image acquisition device 200, for example at a rate corresponding to the image frequency of the image acquisition device 200. The movements thus determined next allow to track observed objects. Various movement estimation methods can be used, such as an optical stream method, determining pixel movements, or a pixel block matching method.

The movement estimation methods can allow to estimate changes over time in positions of distant points of interest (when the movement estimation means 2023 are used on successive distant images in the distant targeting device 110) and/or of local points of interest (when the movement estimation means 2023 are used in successive local images in the local targeting device 112) and to calculate new transformation laws according to these changes over time.

The movement estimation methods may also focus on the distant targeted objects (when the movement estimation means 2023 are used on successive distant images in the distant targeting device 110) and/or local targeted objects (when the movement estimation means 2023 are used in successive local images in the local targeting device 112) and can allow to determine changes over time in positions of the observed objects.

In one embodiment, the movement estimation means 2023 are used by a block matching method. The movement estimation means 2023 (of the local targeting device 112 or distant targeting device 110) then receive two images. Among these two images, a first image, referred to as the "reference image", comprises at least one pattern, a position of which, referred to as the reference position, in the reference image is known. The pattern may be either a point of interest (local or distant) or an observed object (local or distant). When the pattern is a local (or respectively distant) point of interest, the reference position is given by the means for determining points of interest 2020 of the local 112 (or respectively distant 110) targeting device. When the pattern is a distant targeted object, the reference position is the one given by the observer 111. When it is a local targeted object, the reference position is the one obtained by the interpretation means 2022 using the transformation law determined by the matching means 2021 of the local targeting device 112.

At least one block of pixels corresponding to the pattern is next determined in the reference image by the movement estimation means 2023. This block of pixels, referred to as the "reference pattern block", may for example be a block of 8×8 pixels centred on the position of the pattern. The second image, referred to as the "search image", is an image in which the position of the pattern is sought. To do this, the movement estimation means 2023 seek, among the 8×8 blocks of pixels of the search image, an 8×8 block of pixels, referred to as the "sought pattern block", as close as possible to the reference pattern block. A measurement of difference between blocks such as a sum of squared differences (SSD) or a sum of absolute differences (SAD) is then used. The sought pattern block is the block of the search image minimising the difference measurement. The position of the sought pattern block with respect to the position of the reference pattern block is indicated, for example, by a movement vector corresponding to information representing a movement of the pattern between the reference image and the search image.

It should be noted that the exchanges of information between the means of the processing device 202 use for example a communication bus 2024.

FIG. 3 illustrates schematically an example of hardware architecture of the processing device 202. The processing device 202 comprises, connected by a communication bus

305: a processor or CPU (central processing unit) 300; a random access memory (RAM) 301; a read only memory (ROM) 302; a storage unit 303 or a storage medium reader, such as an SD (secure digital) card reader or USB (universal serial bus) keys of a hard disk HDD (hard disk drive); at least one interface 304 allowing to exchange data with other devices. The interface 304 for example enables the processing device 202 to receive images from the image acquisition device 200 and location information from the location device 201, to exchange data with the communication device 203 and to transmit information on the location of a local object to the display device 204.

The processor 300 is capable of executing instructions loaded in the RAM 301 from the ROM 302, from an external memory (not shown), from a storage medium or from a communication network. When the processing device 202 is powered up, the processor 300 is capable of reading instructions from the RAM 301 and executing them. These instructions form a computer program causing the use, by the processor 300, of all or some of the means included in the processing device 202, such as the means 2020 for determining points of interest, the matching means 2021, the interpretation means 2022 and/or the movement estimation means 2023 as well as algorithms and steps described below in relation to FIGS. 4 and 5.

All or some of the means described previously, and algorithms and steps described hereinafter, can thus be implemented in software form by the execution of a set of instructions by a programmable machine such as a DSP (digital signal processor) or a microcontroller, or be implemented in hardware form by a machine or a dedicated component, such as an FPGA (field-programmable gate array) or an ASIC (application-specific integrated circuit).

FIG. 4 illustrates schematically a first example of a collaborative targeting method implemented by the processing device 202 of the local targeting device 112.

The method comprises the execution of a procedure for determining a position of an observed object, referred to as the local targeted object, comprising:

- a step 400 consisting of obtaining information representing a distant targeted object,
- a step 401 consisting of obtaining distant points of interest,
- a step 402 consisting of determining local points of interest,
- a step 403 consisting of applying a method for matching points of interest, the objective of which is to obtain a transformation law allowing to pass from the distant points of interest to the local points of interest,
- a step 404 consisting of checking whether a transformation law has been obtained,
- if a transformation law has been obtained, a step 405 consisting of determining the position of a local targeted object corresponding to the distant targeted object,
- and a step 406 consisting of controlling a display of a local image so as to allow identification of the local targeted object by the observer 113,
- if no transformation law has been obtained, a step 407 during which the observers 111 and 113 are informed that no collaborative observation is possible.

As we describe hereinafter, the method for determining a position of a local targeted object can be implemented iteratively.

During step 400, the processing device 202 of the local targeting device 112 receives information representing the position of a distant targeted object. This information comes from the distant targeting device 110. This information corresponds to a distant targeted object designated by the observer 111 in a first distant image acquired by the image acquisition device 200 of the distant targeting device 110, referred to as the distant designation image.

During step 401, the processing device 202 of the local targeting device 112 receives information representing a list of distant points of interest. This list of distant points of interest represents a second distant image, referred to as the distant points of interest image, acquired by the image acquisition device 200 of the distant targeting device 110. The distant designation image and the distant points of interest image may be the same image or different images. It is however preferable for the two distant images to be close together in time so that a transformation law calculated from the distant points of interest of the distant points of interest image can allow to obtain a local observation point from the distant observation point. The distant points of interest were obtained by the processing device 202 of the distant targeting device 110 using the means 2020 for determining points of interest of the distant targeting device 110.

During step 402, following the reception of the information representing the position of the distant targeted object and the distant points of interest, the processing device 202 of the local targeting device 112 determines a list of local points of interest. To do this, the means 2020 for determining points of interest of the local targeting device 112 are applied to a first local image, referred to as the local points of interest image. The local points of interest image and the distant points of interest image may correspond timewise or not correspond. It is preferable however, for the matching of points of interest to succeed, for the local points of interest image and the distant points of interest image to be close together in time.

During step 403, the processing device 202 of the local targeting device 112 applies a method for matching points of interest to the local points of interest and to the distant points of interest using the matching means 2021 of the local targeting device 112. The objective of step 403 is to pair the local points of interest with distant points of interest, and then to determine a transformation law allowing to pass from the distant points of interest to the local points of interest.

During step 404, the interpretation means 2022 of the processing device 202 of the local targeting device 112 obtain the result of the matching. If no transformation law could be determined, the interpretation means 2022 of the local targeting device 112 deduce, during step 407, that the distant targeted object does not appear in the local points of interest image, or even that the observers 111 and 113 are not looking at the same scene and that consequently no collaborative observation is possible. In this case a message may be sent to the distant targeting device 110 in order to inform the observer 111 of the situation using the communication device 203 of the local targeting device 112.

When it has been possible to determine a transformation law, the processing device 202 of the local targeting device 112 determines, during step 405, using the interpretation means 2022 of the local targeting device 112, the position of the local targeted object in a second local image, referred to as the local designation image. In one embodiment, the position of the local targeted object is determined from the information representing the position of the distant targeted object obtained during step 401 and the transformation obtained during step 403 by the matching means 2021 of the local targeting device 112. The local points of interest image and the local designation image may be the same image or different images, the local designation image following the local points of interest image. It is however preferable for the local points of interest image and the local designation image to be close together in time for the transformation law obtained using the local points of interest image always to be valid for the local designation image. During step 406, the interpretation means 2022 of the local targeting device 112 transmits, to the display device 204 of the local targeting device 112, the position of the local targeted object in the local designation image so that the display device 204 of the local targeting device 112 can control a display of the local designation image in order to allow identification of the local targeted object in the local designation image.

In one embodiment, a graphical reticle is displayed superimposed on the local designation image at the position of the local targeted object.

Following the implementation of step 406, the processing device 202 returns to step 400 and awaits reception of new information representing a distant targeted object.

In one embodiment, the transformation law is obtained by an approach based on a determination of a homographic function.

In one embodiment, the transformation law is determined by an approach based on a bundle adjustment algorithm.

In one embodiment, the position of the local targeted object is used to display a reticle in a local image, referred to as the local follow-up image following the local designation image. In this way, the observer 113 can see the reticle for longer, which facilitates identification of the object.

In one embodiment, two targeting devices may alternately or simultaneously fulfill a role of distant targeting device and local targeting device.

In one embodiment, a local targeting device may communicate simultaneously with a plurality of distant targeting devices. In this case, each distant targeting device transmits the position of a distant targeted object and a list of distant points of interest. The distant targeted objects designated by the distant targeting devices may be potentially all different. In this case, the processing device 202 processes in parallel the information coming from each distant targeting device using the method described in relation to FIG. 4 or 5, and the display device 204 displays a plurality of reticles corresponding to a plurality of objects.

In one embodiment, the local targeting device 112 is provided with one or more motors capable of automatically directing the local targeting device 112 to an observed object without an observer having to manipulate the local targeting device 112. In this embodiment, step 406 comprises a step of controlling the motors of the local targeting device 112. When the motors of the local targeting device 112 are controlled, the position of the local targeted object determined during step 405 is used to control the display of the local images, for example by actuating the motors so that the local targeted object appears at the centre of the local images.

In one embodiment, the method described in relation to FIG. 4 is reiterated periodically by the local targeting device 112, the distant targeting device 110 periodically supplying a new position of the distant targeted object and a new list of distant points of interest to the local targeting device 112.

The method described in relation to FIG. 4 is suitable for the case where the local targeted object appears with a slow movement in successive local images, or even when this local targeted object does not have any movement. This method is unsuitable when the local targeted object appears with a rapid movement in the local images since a position of a local targeted object determined at a given instant quickly becomes obsolete.

FIG. 5 illustrates schematically a second example of a collaborative targeting method used by the processing device 202 of a local targeting device 112. The method described in relation to FIG. 5 is suitable for the case where the local targeted object appears in movement in successive local images. The method described in relation to FIG. 5 comprises an execution of a procedure for determining a position of the local targeted object in which steps 501 to 507 and 510 are respectively identical to steps 400 to 406 and 407, described in relation to FIG. 4.

The procedure for determining a position of the local targeted object described in relation to FIG. 5 also comprises:
  a step 508 of monitoring the local targeted object during which movements of the local targeted object are determined,
  a step 509 during which the processing device 202 of the local targeting device 112 determines whether an updating of the local and/or distant points of interest is necessary.

As we describe hereinafter, the procedure for determining a position of the local targeted object may be implemented iteratively.

Step 507 is followed by step 508. In one embodiment, the local points of interest image and the local designation image are the same image, referred to as the local points of interest image. During step 508, the position of the local targeted object in a third local image, referred to as the local follow-up image, following the local points of interest image is determined. The movement estimation means 2023 of the local targeting device 112 receive as an input the local points of interest image, the local follow-up image and the position of the observed object in the local points of interest image, this position having been determined by the interpretation means 2022 of the local targeting device 112 using the transformation law determined during step 504. The local points of interest image is used as the reference image. The local follow-up image is used as the search image. The movement estimation means 2023 of the local targeting device 112 next determine coordinates of a motion vector corresponding to the movement of the local targeted object between the local points of interest image and the local follow-up image. The position of the local targeted object in the local follow-up image is next determined by adding, to the position of the local targeted object in the local follow-up image, the coordinates of the motion vector that were determined.

During step 509, the processing device 202 of the local targeting device 112 determines whether it is necessary to update the local and distant points of interest. The points of interest determined on an image have a limited validity duration dependent on the movements in the images. In one embodiment, if the local targeted object has a movement amplitude greater than a first threshold, the processing device 202 of the local targeting device 112 considers that the points of interest must be updated. The amplitude of a movement can be determined by calculating a norm of the motion vector corresponding to the movement of the local targeted object. The processing device 202 of the local targeting device 112 then sends, by means of the communication device 203 of the local targeting device 112, a message to the distant targeting device 110 so that it transmits new information representing a position of a distant targeted object and new distant points of interest and returns to step 501 when information representing a new position of a distant targeted object and a new list of distant points of interest is received.

If the points of interest are considered to be valid, step 509 is followed by step 507, during which a reticle is displayed in the local follow-up image at the position of the local targeted object determined.

In one embodiment, steps 507, 508 and 509 are iterated on a plurality of successive local follow-up images, the local points of interest image being used as the reference image during each iteration.

In an embodiment alternative to the embodiment in FIG. 5, the distant targeting device 110 determines changes over time in the position of the distant targeted object. In this way the distant targeting device 110 determines whether it is necessary to send a new position of the distant targeted object and new distant points of interest to the local targeting device 112. The position of the distant targeted object in a third distant image, referred to as the distant follow-up image, following the distant designation image is determined. The movement estimation means 2023 of the distant targeting device 110 receive as an input the distant designation image, the distant follow-up image and the position of the observed object in the distant designation image, this position having been designated by the observer 111. The distant designation image is used as the reference image. The distant follow-up image is used as the search image. The movement estimation means 2023 of the distant targeting device 110 next determine a motion vector corresponding to the movement of the distant targeted object between the distant designation image and the distant follow-up image. A new position of the distant targeted object can then be calculated by the processing device 202 of the distant targeting device 110 using the motion vector determined. The norm of the motion vector determined is next calculated by the processing device 202 of the distant targeting device 110 in order to measure the amplitude of the movement of the distant targeted object between the distant designation image and the distant follow-up image. If the amplitude of the movement is greater than a second threshold, the processing device 202 of the distant targeting device 110 determines new distant points of interest and sends information representing the new position of the distant targeted object and a list comprising the new distant points of interest to the local targeting device 112. In this embodiment, the local targeting device 112 implements the method described in relation to FIG. 4 at each reception of new information representing the position of the distant targeted object and a new list of distant points of interest.

In an embodiment alternative to the embodiment in FIG. 5, a movement amplitude is calculated in a distant follow-up image for each distant point of interest by the movement estimation means 2023 of the distant targeting device 110. In this embodiment, the processing device 202 of the distant targeting device 110 determines a proportion of distant points of interest among the distant points of interest determined on the distant points of interest image having a movement amplitude between the distant points of interest image and the distant follow-up image greater than a third threshold. When said proportion is above a fourth threshold, the processing device 202 of the distant targeting device 110 determines new points of interest and sends information representing a new position of the distant targeted object and a list comprising the new distant points of interest to the local targeting device 112. In this embodiment, the local targeting device 112 implements the method described in relation to FIG. 4 at each reception of new information representing the position of the distant targeted object and a new list of distant points of interest.

In one embodiment, the processing device 202 of the distant targeting device 110 carries out an estimation of movement between the distant points of interest image and the distant follow-up image for each distant point of interest and for the distant targeted object. In this way, the distant targeting device 110 obtains a motion vector for each distant point of interest and for the distant targeted object. In this embodiment, the processing device 202 of the distant targeting device 110 determines a proportion of distant points of interest among the distant points of interest determined in the distant points of interest image having an amplitude of movement between the distant points of interest image and the distant follow-up image greater than the third threshold. When said proportion is above the fourth threshold, the distant targeting device 110 sends the motion vectors associated with the distant points of interest and with the distant targeted object to the local targeting device 112. When it receives the motion vectors, the local targeting device 112 implements the method described in relation to FIG. 4, updating, during steps 400 and 401, the positions of the distant targeted object and of the distant points of interest by means of the motion vectors received.

It should be noted that the first, second, third and fourth thresholds are determined empirically, for example when the targeting devices are configured. In one embodiment, the local points of interest image and the local designation image are two different images. This case may occur when the matching of the points of interest takes a sufficiently long time for at least one new local image to have been acquired by the image acquisition device 200 of the local targeting device 112 after the local points of interest image. In this case, the transformation law obtained during step 403 (or 504) allows to obtain the position of the local targeted object in the local points of interest image, but not the position of the local targeted object in the local designation image. In this embodiment, an estimation of the movement of the local targeted object is carried out by the processing device 202 of the local targeting device 112 between the local points of interest image and the local designation image. In this way, the position of the local targeted object in the local designation image is determined.

The invention claimed is:

1. A method for collaborative observation between a local targeting device and a distant targeting device located at different geographical positions and able to acquire at least one image, referred to respectively as the local image and the distant image, the method comprising, when implemented by the local targeting device:

executing a procedure for determining a position of an observed object, referred to as the local targeted object, comprising:

obtaining from the distant targeting device information representing a position of an observed object, referred to as the distant targeted object, in a first distant image, referred to as the distant designation image;

obtaining from the distant targeting device information representing points of interest, referred to as distant points of interest, representing a second distant image, referred to as the distant points of interest image;

determining points of interest, referred to as local points of interest, representing a first local image, referred to as the local points of interest image;

applying a method for matching points of interest with the local points of interest and the distant points of interest, the purpose of which is to obtain a transformation law allowing to pass from the local points of interest to the distant points of interest;

checking whether the application of the matching method made it possible to obtain a transformation law;

if no transformation law is obtained, determining that no collaborative observation is possible;

if a transformation law has been obtained, determining in a second local image, referred to as the local designation image, the position of the local targeted object according to positioning information comprising the information representing the position of the distant targeted object and the transformation law;

controlling a display of a third local image, referred to as the local follow-up image, so as to allow identification of the local targeted object; wherein the local targeting device executes the step of determining the position of the local targeted object when it receives from the distant targeting device, information representing a new position of the distant targeted object and information representing new distant points of interest, the local targeting device obtaining information representative of a new position of the distant targeted object and information representative of new distant points of interest only when one of the following two cases occurs:

when an amplitude of a movement of the distant targeted object between the distant designation image and a third distant image, referred to as the distant follow-up image, following the distant designation image is above a first predefined threshold;

when a proportion of distant points of interest for which an amplitude of movement between the distant designation image and the distant follow-up image is above the first predefined threshold, is above a second predefined threshold.

2. The method according to claim 1, wherein the transformation law is obtained by an approach based on a determination of a homographic function or an approach based on a bundle adjustment algorithm.

3. The method according to claim 1, wherein, during the step of controlling the display of a local follow-up image, a reticle is displayed in the local follow-up image at the position of the local targeted object.

4. The method according to claim 1, wherein the local targeting device is provided with one or more motors capable of automatically directing the local targeting device towards an observed object and in that, during the step of controlling the display of a local follow-up image, the position of the local targeted object is used to control each motor so that the local targeted object appears at the centre of the local follow-up image.

5. The method according to claim 1, wherein the distant designation image and the distant points of interest image are the same image or two different images.

6. The method according to claim 1, wherein the local points of interest image and the local designation image are the same image or two different images and in that, when the local points of interest image and the local designation image are two different images, an estimation of the movement of the local targeted object between the local points of interest image and the local designation image is carried out, the determination of the position of the local targeted object in the local designation image takes into account said movement of the local targeted object between the local points of interest image and the local designation image.

7. The method according to claim 1, wherein the distant designation image corresponds timewise to the local points of interest image.

8. A collaborative targeting system comprising a local targeting device and at least one distant targeting device, the local targeting device being situated at a first geographical position and being able to acquire images, referred to as local images, and comprising circuitry adapted for:

executing a procedure for determining a position of an observed object, referred to as the local targeted object, comprising:

obtaining, from the distant targeting device, information representing a position of an observed object, referred to as the distant targeted object, in a first image acquired by the distant targeting device, referred to as the distant designation image;

obtaining from the distant targeting device information representing points of interest, referred to as distant points of interest, representing a second image acquired by the distant targeting device, referred to as distant images of points of interest;

determining points of interest, referred to as local points of interest, representing a first local image, referred to as the local points of interest image;

applying a method for matching points of interest with the local points of interest and with the distant points of interest, the purpose of which is to obtain a transformation law allowing to pass from the local points of interest to the distant points of interest;

checking whether the application of the matching method has made it possible to obtain a transformation law;

determining that no collaborative observation is implemented if no transformation law has been obtained;

determining, in a second local image, referred to as the local designation image, the position of the local targeted object according to positioning information comprising the information representing the position of the distant targeted object and the transformation law;

controlling a display of a third local image, referred to as the local follow-up image, so as to allow identification of the local targeted object, used if a transformation law has been obtained;

the local targeting device being configured to determine the position of the local targeted object when it receives from the distant targeting device information representative of a new position of the distant targeted object and information representing new distant points of interest;

the distant targeting device being situated at a second geographical position different from the first geographical position and being able to acquire images, referred to as distant images, and comprising circuitry adapted for:

designating the distant targeted object;

determining said distant points of interest; and transmitting information representing the position of the distant targeted object and distant points of interest to the local targeting device, the local targeting device obtaining information representative of a new position of the distant targeted object and information representative of new distant points of interest only when one of the following two cases occurs:

when an amplitude of a movement of the distant targeted object between the distant designation image and a third distant image, referred to as the distant follow-up image, following the distant designation image is above a first predefined threshold; and when a proportion of distant points of interest for which an amplitude of movement between the distant designation image and the distant follow-up image is above the first predefined threshold, is above a second predefined threshold.

9. A non-transitory storage medium storing a computer program comprising program code instructions which can be loaded in a programmable device to cause said programmable device to implement, the method according to claim 1 when the said program code instructions is executed by a processor of the programmable device.

* * * * *